United States Patent
Xiao

(10) Patent No.: US 12,202,523 B2
(45) Date of Patent: Jan. 21, 2025

(54) PICKUP AND PARKING METHOD FOR AUTONOMOUS DRIVING VEHICLE AND COMPUTER DEVICE

(71) Applicant: SHENZHEN ANTU AUTONOMOUS DRIVING TECHNOLOGIES LTD., Shenzhen (CN)

(72) Inventor: Jianxiong Xiao, Shenzhen (CN)

(73) Assignee: SHENZHEN ANTU AUTONOMOUS DRIVING TECHNOLOGIES LTD., Shenzhen (CN)

( * ) Notice: Subject to any disclaimer, the term of this patent is extended or adjusted under 35 U.S.C. 154(b) by 401 days.

(21) Appl. No.: 17/685,332

(22) Filed: Mar. 2, 2022

(65) Prior Publication Data
US 2022/0281488 A1    Sep. 8, 2022

(30) Foreign Application Priority Data
Mar. 3, 2021 (CN) .......................... 202110236575.3

(51) Int. Cl.
*B60W 60/00* (2020.01)
*B60W 30/06* (2006.01)
*G06Q 50/40* (2024.01)

(52) U.S. Cl.
CPC ...... *B60W 60/00253* (2020.02); *B60W 30/06* (2013.01); *B60W 60/0011* (2020.02); *B60W 60/0021* (2020.02); *G06Q 50/40* (2024.01); *B60W 2540/041* (2020.02); *B60W 2556/50* (2020.02)

(58) Field of Classification Search
CPC ........... B60W 60/00253; B60W 30/06; B60W 60/0011; B60W 60/0021; B60W 2540/041; B60W 2556/50; B60W 60/00256; B60W 60/0025; B60W 50/00; G06Q 50/40

See application file for complete search history.

(56) References Cited

U.S. PATENT DOCUMENTS

| | | | |
|---|---|---|---|
| 2017/0277191 A1* | 9/2017 | Fairfield | ................ G08G 1/005 |
| 2018/0267541 A1* | 9/2018 | Goldberg | ............... G08G 1/202 |
| 2019/0243368 A1* | 8/2019 | Seki | ................ B60W 60/00253 |
| 2019/0244317 A1* | 8/2019 | Seki | ..................... G05D 1/0011 |

(Continued)

FOREIGN PATENT DOCUMENTS

CN    110119832 A    8/2019

*Primary Examiner* — James J Lee
*Assistant Examiner* — Alexander George Matta
(74) *Attorney, Agent, or Firm* — Hemisphere Law, PLLC; Zhigang Ma

(57) ABSTRACT

A control method for an autonomous driving vehicle is provided. The control method comprises steps of: determining whether trigger information is received; when the trigger information is received and the autonomous driving vehicle has been located at a predetermined location at current moment, obtaining an arrival time required for a predetermined target to reach the predetermined location, the predetermined location is a preset connection location; determining whether the arrival time is greater than a preset value; when the arrival time is greater than the preset value, controlling the autonomous driving vehicle to drive to a parking area; and when the arrival time is not greater than the preset value, controlling the autonomous driving vehicle to drive according to preset rules. Furthermore, a computer device is also provided.

12 Claims, 4 Drawing Sheets

(56) References Cited

U.S. PATENT DOCUMENTS

2021/0034055 A1\* 2/2021 Mukaiyama ......... G08G 1/0137
2021/0061263 A1\* 3/2021 Inaba ................... B60W 30/06
2021/0217313 A1\* 7/2021 Hirose ............... G01C 21/3446

\* cited by examiner

PICKUP AND PARKING METHOD FOR AUTONOMOUS DRIVING VEHICLE AND COMPUTER DEVICE

CROSS REFERENCE TO RELATED APPLICATION

This non-provisional patent application claims priority under 35 U.S.C. § 119 from Chinese Patent Application No. 202110236575.3 filed on Mar. 3, 2021, the entire content of which is incorporated herein by reference.

TECHNICAL FIELD

The disclosure relates to the field of autonomous driving technology, and in particular to a control method for an autonomous driving vehicle and a computer device.

BACKGROUND

Nowadays, autonomous driving vehicles are developing rapidly. Development of autonomous driving technology has become an inevitable trend in development of vehicle engineering. The autonomous driving vehicles conform to a concept of environmental friendliness, meet requirements of social development, such as high efficiency and low cost, and are more convenient for people's work and life. For example, the autonomous driving vehicles can be used as taxis to carry passengers, and can also be used as logistics vehicles to send and receive goods. When the autonomous driving vehicles are waiting for passengers or goods to be connected, the passengers or goods have not arrived, and waiting time of the autonomous driving vehicles has exceeded predetermined time, or the autonomous driving vehicles cannot continue to park at current location, indicating that the autonomous driving vehicles has waited for timeouts.

Therefore, how to control the autonomous driving vehicles to deal with this situation is an urgent problem to be solved.

SUMMARY

The disclosure provides a control method for autonomous driving vehicle, and a computer device, the control method can control the autonomous driving vehicles to deal with the situation of waiting for timeouts in time.

A first aspect of the disclosure provides a control method for an autonomous driving vehicle, and the control method for the autonomous driving vehicle includes the steps of: determining whether trigger information is received, the trigger information being indicated that a preset event occurs; when the trigger information is received and the autonomous driving vehicle has been located at the predetermined location at current moment, obtaining an arrival time required for a predetermined target to reach the predetermined location, the predetermined location is a preset connection location; determining whether the arrival time is greater than a preset value; when the arrival time is greater than the preset value, controlling the autonomous driving vehicle to drive to a parking area different from the preset connection location; and when the arrival time is not greater than the preset value, controlling the autonomous driving vehicle to drive away from the predetermined location to the predetermined location again or a re-planning connection location according to preset rules.

A second aspect of the disclosure provides a computer device, the computer device comprises: a memory configured to store program instructions and a processor configured to execute the program instructions to enable the computer device to perform a control method for an autonomous driving vehicle, and the control method for the autonomous driving vehicle comprises the steps of: determining whether trigger information is received, the trigger information being indicated that a preset event occurs; when the trigger information is received and the autonomous driving vehicle has been located at the predetermined location at current moment, obtaining an arrival time required for a predetermined target to reach the predetermined location, the predetermined location is a preset connection location; determining whether the arrival time is greater than a preset value; when the arrival time is greater than the preset value, controlling the autonomous driving vehicle to drive to a parking area different from the preset connection location; and when the arrival time is not greater than the preset value, controlling the autonomous driving vehicle to drive away from the predetermined location to the predetermined location again or a re-planning connection location according to preset rules.

The control method for an autonomous driving vehicle and computer device, control the autonomous driving vehicle to drive to the parking area different from the preset connection location, or control the autonomous driving vehicle to drive away from the predetermined location to the predetermined location again or the re-planning connection location according to the preset rules, according to the arrival time required for the predetermined target to reach the predetermined location, so as to deal with the preset event. In addition, different coping strategies are executed according to comparison result between the arrival time and the preset value, which makes the autonomous driving vehicle more flexible in dealing with the preset event.

BRIEF DESCRIPTION OF THE DRAWINGS

In order to illustrate the technical solution in the embodiments of the disclosure or the prior art more clearly, a brief description of drawings required in the embodiments or the prior art is given below. Obviously, the drawings described below are only some of the embodiments of the disclosure. For ordinary technicians in this field, other drawings can be obtained according to the structures shown in these drawings without any creative effort.

DETAILED DESCRIPTION OF THE EMBODIMENTS

In order to make purpose, technical solution and advantages of the disclosure more clearly, the disclosure is further described in detail in combination with drawings and embodiments. It is understood that the specific embodiments described herein are used only to explain the disclosure and are not used to define it. On the basis of the embodiments in the disclosure, all other embodiments obtained by ordinary technicians in this field without any creative effort are covered by protection of the disclosure.

Terms "first", "second", "third", "fourth", if any, in specification, claims and drawings of this application are used to distinguish similar objects and need not be used to describe any particular order or sequence of priorities. It should be understood that data are interchangeable when appropriate, in other words, the embodiments described can be implemented in order other than what is illustrated or described here. In addition, terms "include" and "have" and any variation of them, can encompass other things. For example, processes, methods, systems, products, or equipment that comprise a series of steps or units need not be limited to those clearly listed, but may include other steps or units that are not clearly listed or are inherent to these processes, methods, systems, products, or equipment.

It is to be noted that description refers to "first", "second", etc. in the disclosure are for descriptive purpose only and neither be construed or implied relative importance nor indicated as implying number of technical features. Thus, feature defined as "first" or "second" can explicitly or implicitly include one or more features. In addition, technical solutions between embodiments may be integrated, but only on the basis that they can be implemented by ordinary technicians in this field. When the combination of technical solutions is contradictory or impossible to be realized, such combination of technical solutions shall be deemed to be non-existent and not within the scope of protection required by the disclosure.

Figure 1:
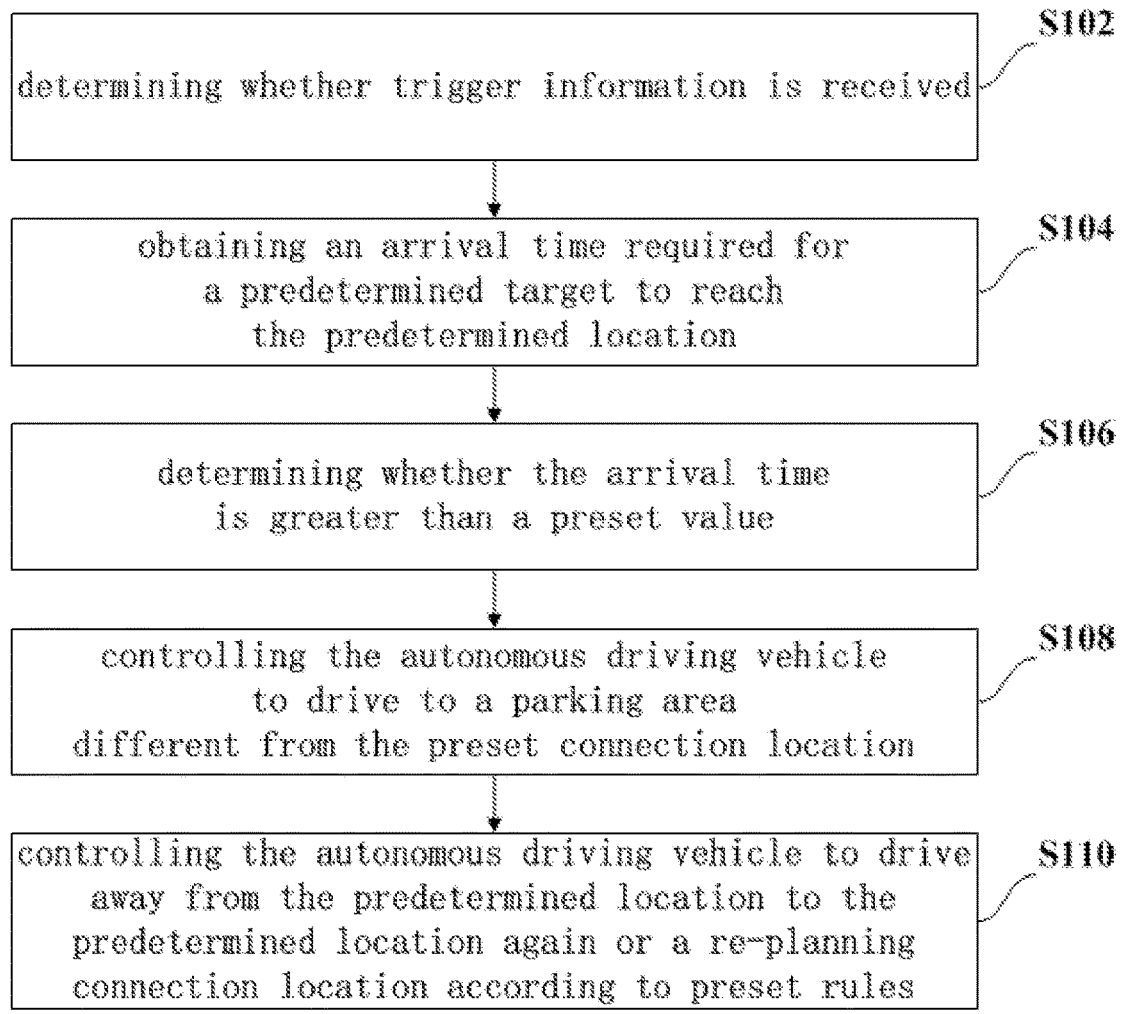
FIG. 1 illustrates a flow diagram of a control method for an autonomous driving vehicle in accordance with an embodiment.
Figure 5:
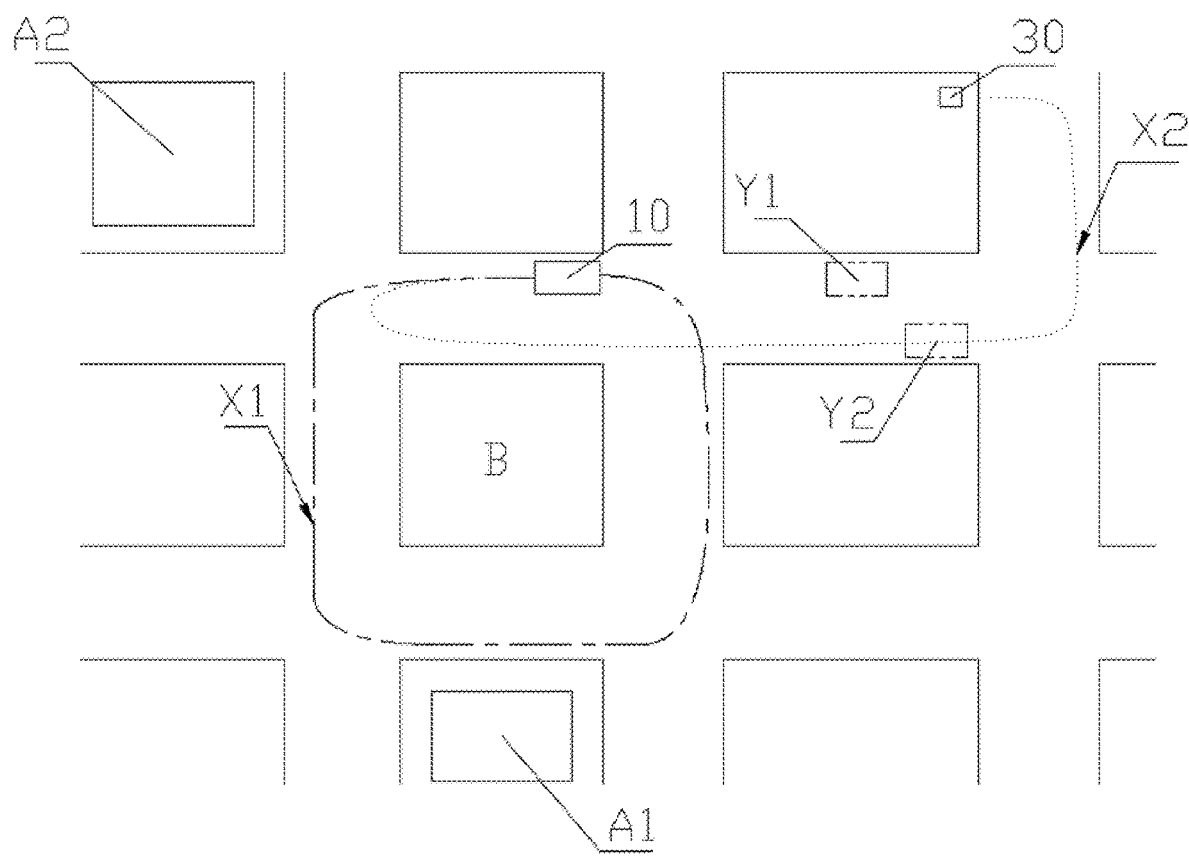
FIG. 5 illustrates a schematic diagram of a control method for an autonomous driving vehicle in accordance with the embodiment.

Referring to FIG. 1 and FIG. 5, FIG. 1 illustrates a flow diagram of a control method for an autonomous driving vehicle in accordance with an embodiment, FIG. 5 illustrates a schematic diagram of a control method for an autonomous driving vehicle in accordance with the embodiment. The control method for autonomous driving vehicle includes but is not limited to applied to cars, motorcycles, trucks, sport utility vehicles, recreational vehicles, aircraft and other transportation equipment to control transportation equipment. In this embodiment, when the transportation equipment stops at a certain location and waits for the target to be connected, waiting time of the transportation equipment has exceeded predetermined time, or the transportation equipment cannot continue to park at current location, the control method is used to control the transportation equipment to deal with in time.

In this embodiment, the control method is performed in an autonomous driving vehicle 10. The autonomous driving vehicle 10 has a level-five autonomous driving system. The level-five autonomous driving system refers to "full automation". Generally, vehicles with the level-five autonomous driving system can drive themselves on any legal and drivable road environment. Human drivers only need to set up the destination and turn on the level-five autonomous driving system, and the vehicles can be driven to the designated place through an optimized route.

In the current environment, the autonomous driving vehicle 10 is a taxi. At the current moment, the autonomous driving vehicle 10 is parked on the side of the road and waiting for passengers to get on. There is going to describe this embodiment in detail below by taking this current environment as an example. The control method for an autonomous driving vehicle comprises the following steps.

In step S102, it is determined that whether trigger information is received. The trigger information being indicated that a preset event occurs. In detail, this disclosure determines whether the trigger information is received through a computer device 20 set in the autonomous driving vehicle 10. In this embodiment, the preset event includes but is not limited to the autonomous driving vehicle 10 waits for timeouts and a predetermined target 30 has not yet arrived, other vehicles or security personnel or traffic police signal the autonomous driving vehicle 10 to leave, and waiting time of the autonomous driving vehicle 10 exceeds a parking time allowed by rules and regulations, such as airport stipulates that you must leave within three minutes. The predetermined target 30 includes but is not limited to preset passengers or goods that needs to be connected. When the preset event is that the autonomous driving vehicle 10 waits for timeouts and a predetermined target 30 has not yet arrived, corresponding trigger information is non-arrival notification. When the preset event is that other vehicles or security personnel or traffic police signal the autonomous driving vehicle 10 to leave, corresponding trigger information is horn or whistle issued by other vehicles or security personnel or traffic police. When the preset event is that waiting time of the autonomous driving vehicle 10 exceeds a parking time allowed by rules and regulations, corresponding trigger information is timeouts notification. When the trigger information is received, step S104 is performed. In the current environment, the preset event is that the autonomous driving vehicle 10 waits for timeouts and the predetermined target 30 has not yet arrived. The predetermined target 30 is a passenger. The autonomous driving vehicle 10 receives the corresponding trigger information is that the passenger has not arrived notification.

In step S104, when the trigger information is received and the autonomous driving vehicle has been located at a predetermined location at current moment, an arrival time required for a predetermined target to reach the predetermined location is obtained. In detail, this disclosure obtains the arrival time through the computer device 20. The predetermined location is a preset connection location. In this embodiment, the computer device 20 obtains a first positioning information of the predetermined target 30 at the current moment and a second positioning information of the autonomous driving vehicle 10 at the current moment. The computer device 20 calculates the arrival time according to a high-precision map, the first positioning information, and the second positioning information. The computer device 20 can obtain the first positioning information through a terminal device (not shown) set in the predetermined target 30. When the predetermined target 30 is a person, the terminal device includes but is not limited to communication devices such as mobile phones and electronic watches. That is to say, the computer device 20 can calculate the arrival time required for the predetermined target 30 to reach the predetermined location by obtaining location of the autonomous driving vehicle 10 and the predetermined target 30 in high-precision map. For example, when the predetermined target 30 is a person, the computer device 20 can calculate the arrival time through average speed of walking and distance between the predetermined target 30 and the autonomous driving vehicle 10. When the predetermined target 30 is a transportation device, the computer device 20 can calculate the arrival time according to speed limit information of road where the transportation device is located and distance between the predetermined target 30 and the autonomous driving vehicle 10. In the current environment, the autonomous driving device 10 is parked at the predetermined location, and distance between the passenger and the autonomous driving vehicle 10 is 1 km. If walking speed of the passenger is about 1.5 m/s, the computer device 20 can calculate the arrival time required by the passenger is about 11 minutes.

In some embodiments, the computer device 20 can send confirmation instruction to the predetermined target 30. The confirmation instruction includes several time options for selection by the predetermined target 30. The computer device 20 receive one of the several time options sent by the predetermined target 30 as the arrival time. For example, the computer device 20 of the autonomous driving vehicle 10 sends the confirmation instruction to the predetermined target 30. The several time options of the confirmation instruction include 5 minutes, 10 minutes, 15 minutes, 20 minutes, etc. After receiving the confirmation instruction, the predetermined target 30 selects one of the time options and sends it to the computer device 20. If one of the time options selected by the predetermined target 30 is 10 minutes, it means that it will take about 10 minutes for the predetermined target 30 to reach the predetermined location.

In step S106, it is determined that whether the arrival time is greater than a preset value. In detail, the computer device 20 determines whether the arrival time is greater than the preset value. When the arrival time is greater than the preset value, step S108 is performed. When the arrival time is not greater than the preset value, step S110 is performed. The preset value can be 10-20 minutes, and the preset value can also be set according to actual situation.

In step S108, when the arrival time is greater than the preset value, the autonomous driving vehicle is controlled to drive to a parking area different from the preset connection location. In detail, this disclosure controls the autonomous driving vehicle 10 drive to the parking area through the computer device 20. In this embodiment, the computer device 20 obtains several parking areas according to the high-precision map. The several parking areas are parking areas located within a preset range of the autonomous driving vehicle 10. The preset range of the autonomous driving vehicle 10 can be set according to the actual situation. Then, the computer device 20 selects a parking area closest to the predetermined location from several parking areas as a closest parking area, and controls the autonomous driving vehicle 10 to drive to the closest parking area. In the current environment, the computer device 20 obtains two parking areas A1 and A2 according to the high-precision map. It can be analysis that distance between the parking area A2 and the predetermined location is smaller than distance between the parking area A1 and the predetermined location. Therefore, the parking area A2 is the closest parking area. The computer device 20 controls the autonomous driving vehicle 10 to drive to the parking area A2.

In step S110, when the arrival time is not greater than the preset value, the autonomous driving vehicle is controlled to drive away from the predetermined location to the predetermined location again or a re-planning connection location according to preset rules. In detail, the computer device 20 controls the autonomous driving vehicle 10 to drive away from the predetermined location to the predetermined location again or the re-planning connection location according to the preset rules. The preset rules include but are not limited to detouring, and driving to the re-planning connection location, etc.

When the preset rule is detour, the computer device 20 controls the autonomous driving vehicle 10 to drive on the road near the predetermined location. In detail, the computer device 20 generates a first driving trajectory X1 according to the high-precision map, the arrival time, and a preset driving speed. Destination of the first driving trajectory X1 is the predetermined location. The preset driving speed is a preset driving speed of the autonomous driving vehicle 10. The computer device 20 controls the autonomous driving vehicle 10 to drive away from the predetermined location to the predetermined location again according to the first driving trajectory X1 at the preset driving speed. It can be understood that the autonomous driving vehicle 10 leaves the predetermined location and drives according to the first driving trajectory X1, and finally drives back to the predetermined location. Time required for the autonomous driving vehicle 10 to drive according to the first driving trajectory X1 is the same as or close to the arrival time. In the current environment, the arrival time is 11 minutes. If the preset driving speed is 40 km/h, the computer device 20 can calculates that the autonomous driving vehicle 10 can drive approximately 7.3 km before the passenger reaches the predetermined location. The computer device 20 generates the first driving trajectory X1 is a path surrounding block B according to the high-precision map.

When the preset rule is to drive to the re-planning connection location, the computer device 20 plans a new connection location according to path taken by the predetermined target 30 to the predetermined location, and controls the autonomous driving vehicle 10 to drive to the re-planning connection location. In detail, the computer device 20 generates a second driving trajectory X2 according to the high-precision map, the first positioning information, and the second positioning information. A starting point of the second driving trajectory X2 is the predetermined location, destination of the second driving trajectory X2 is a location of the predetermined target at the current moment. The computer device 20 generates a second connection location Y2 according to the second driving trajectory X2, the arrival time, and the preset driving speed. The second connection location Y2 is the re-planning connection location that at the second driving trajectory X2. The computer device 20 controls the autonomous driving vehicle 10 to drive away from the predetermined location to the second connection location Y2 according to the second driving trajectory X2 at the preset driving speed. It can be understood that time required for the autonomous driving vehicle 10 to leave the predetermined location and drive to the second connection location Y2 is the same as or close to time required for the predetermined target 30 to move from the current location to the second connection location Y2.

In the above embodiment, when the autonomous driving vehicle has waited for timeouts or other vehicles or personnel signal the autonomous driving vehicle to leave, the autonomous driving vehicle is controlled to drive to the parking area different from the preset connection location, or drive away from the predetermined location to the predetermined location again or the re-planning connection location according to the preset rules, according to the arrival time required for the predetermined target to reach the predetermined location, so as to deal with the preset event. Meanwhile, when the arrival time is greater than the preset value, the autonomous driving vehicle is controlled to drive to the closest parking area. When the arrival time is not greater than the preset value, the autonomous driving vehicle is controlled to detour or drive to the re-planning connection location. Different coping strategies are executed according to comparison result between the arrival time and the preset value, which makes the autonomous driving vehicle more flexible in dealing with the preset event.

Figure 2:
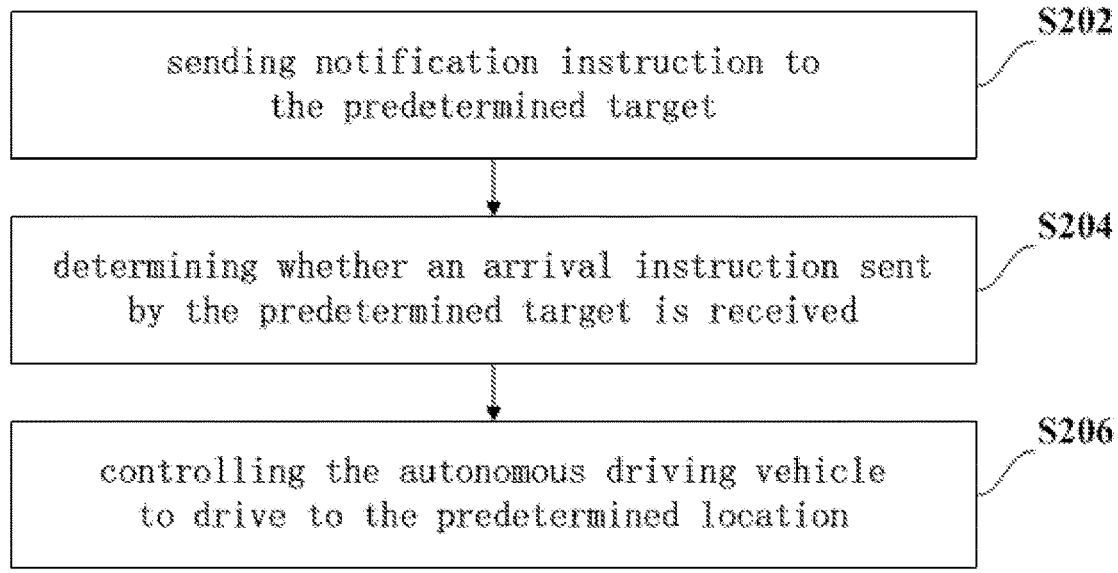
FIG. 2 illustrates a first sub flow diagram of a control method for an autonomous driving vehicle in accordance with the embodiment.

Referring to FIG. 2, FIG. 2 illustrates a first sub flow diagram of a control method for an autonomous driving vehicle in accordance with the embodiment. After performing step S108, the control method further includes the following steps.

In step S202, notification instruction is sent to the predetermined target. In detail, this disclosure sends the notification instruction to the predetermined target through the computer device 20. The notification instruction is used to notify the predetermined target 30 that the autonomous driving vehicle 10 has left the predetermined location.

In step S204, it is determined that whether an arrival instruction sent by the predetermined target is received. In detail, this disclosure uses the computer device 20 to determine whether the arrival instruction sent by the predetermined target 30 is received. The predetermined target 30 can send the arrival instruction to the computer device 20 when reaching the predetermined location or about to reach the predetermined location.

In step S206, when the arrival instruction sent by the predetermined target is received, the autonomous driving vehicle 10 is controlled to drive to the predetermined location. In detail, when the arrival instruction sent by the predetermined target 30 is received, this disclosure uses the computer device 20 control the autonomous driving vehicle 10 to drive to the predetermined location.

In the above embodiment, after controlling the autonomous driving vehicle to drive to the closest parking area, the autonomous driving vehicle is controlled to drive back to the predetermined location to connect with the predetermined target if the autonomous driving vehicle receives the arrival instruction sent by the predetermined target. At the same time, the predetermined target can send the arrival instruction in advance according to the actual situation, so that the autonomous driving vehicle has sufficient time to return to the predetermined location. Then the predetermined target does not need to wait too long at the predetermined location.

Figure 3:
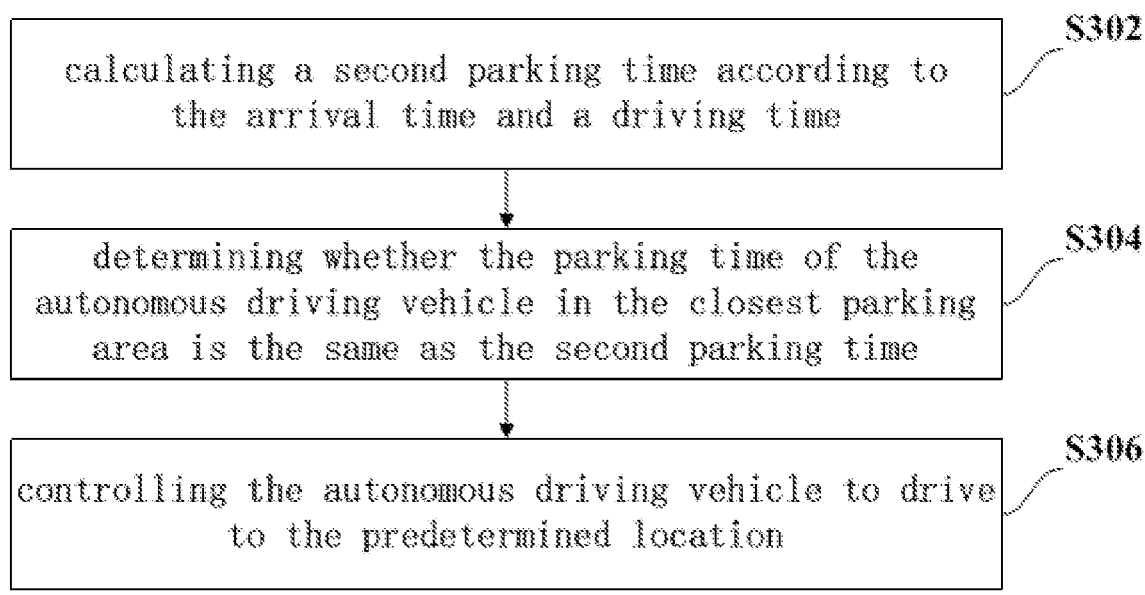
FIG. 3 illustrates a second sub flow diagram of a control method for an autonomous driving vehicle in accordance with the embodiment.

Referring to FIG. 3, FIG. 3 illustrates a second sub flow diagram of a control method for an autonomous driving vehicle in accordance with the embodiment. After performing step S108, the control method further includes the following steps.

In step S302, a second parking time is calculated according to the arrival time and a driving time. In detail, this disclosure uses the computer device 20 to calculate the second parking time according to the arrival time and the driving time. The driving time is the time for the autonomous driving vehicle 10 to drive from the predetermined location to the closest parking area. In this embodiment, the second parking time is the arrival time minus twice the driving time. It can be understood that the second parking time plus round-trip time of the autonomous driving vehicle 10 between the predetermined location and the closest parking area equals the arrival time. That is to say, when the autonomous driving vehicle 10 drives back to the predetermined location after parking in the closest parking area for the second parking time, the predetermined target 30 just arrives at the predetermined location, or the predetermined target 30 arrives at the predetermined location before or after than the autonomous driving vehicle 10. In the current environment, the autonomous driving vehicle 10 is driving to the parking area A2 for parking, distance between the predetermined location and the parking area A2 is 0.5 km. According to the preset driving speed of 40 km/h, it can be calculated that the driving time of the autonomous driving vehicle 10 to drive from the predetermined location to the parking area A2 is 0.75 minutes. Since the arrival time is 11 minutes, the second parking time can be calculated to be 9.5 minutes.

In step S304, it is determined that whether the parking time of the autonomous driving vehicle in the closest parking area is the same as the second parking time. In detail, this disclosure uses the computer device 20 to determine whether the parking time of the autonomous driving vehicle 10 in the closest parking area is the same as the second parking time. In this embodiment, when the autonomous driving vehicle 10 drives to the closest parking area, the timing starts to obtain the parking time.

In step S306, when the parking time of the autonomous driving vehicle in the closest parking area is the same as the second parking time, the autonomous driving vehicle is controlled to drive to the predetermined location. In detail, when the parking time is the same as the second parking time, this disclosure uses the computer device 20 to control the autonomous driving vehicle 10 to drive to the predetermined location.

In the above embodiment, after the autonomous driving vehicle is controlled to drive to the closest parking area, the parking time start to timing. The autonomous driving vehicle is controlled to park in the closest parking area for a period of time, and then drive to the predetermined location to connect with the predetermined target. When the autonomous driving vehicle drives back to the predetermined location after parking in the closest parking area for the second parking time, the predetermined target just arrives at the predetermined location, or the predetermined target arrives at the predetermined location before or after than the autonomous driving vehicle. Then the predetermined target does not need to wait too long at the predetermined location.

Figure 4:
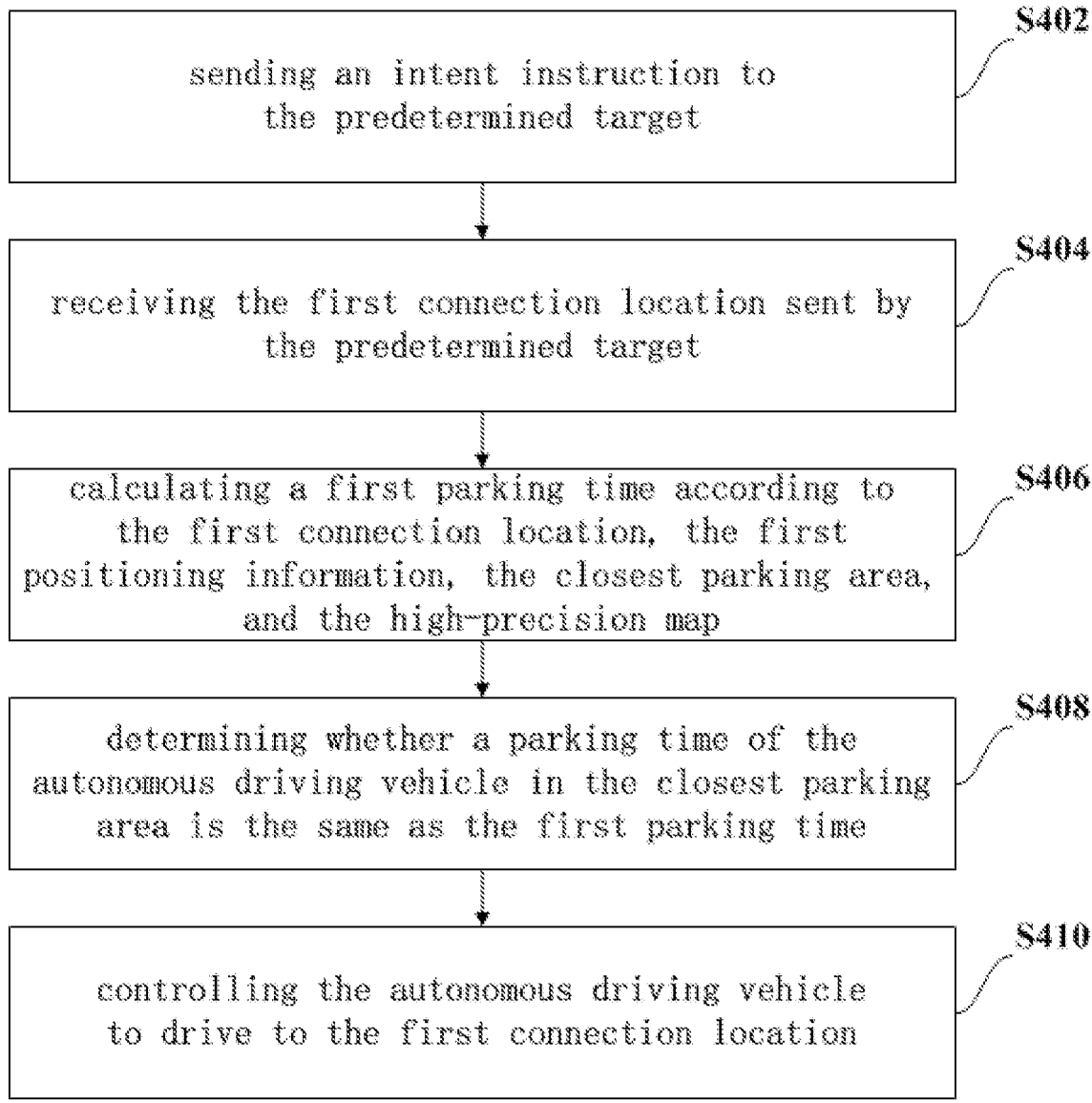
FIG. 4 illustrates a third sub flow diagram of a control method for an autonomous driving vehicle in accordance with the embodiment.

Referring to FIG. 4, FIG. 4 illustrates a third sub flow diagram of a control method for an autonomous driving vehicle in accordance with the embodiment. After performing step S108, the control method further includes the following steps.

In step S402, an intent instruction is sent to the predetermined target. In detail, this disclosure uses the computer device 20 to send the intent instruction to the predetermined target 30. The intent instruction is used for the predetermined target 30 to select a first connection location Y1. The first connection location Y1 is the predetermined location or the re-planning connection location includes the closest parking area and a new designated location. In this embodiment, the intent instruction provides several selectable locations to the predetermined target 30. The selectable locations include but are not limited to predetermined location, the parking areas, randomly generated location, etc. The predetermined target 30 can select one of the selectable locations according to the actual situation. It can be understood that when there is no location that the predetermined target 30 wants to select among the selectable locations, the predetermined target 30 can input other locations through the terminal device to form the first connection location Y1.

In step S404, the first connection location sent by the predetermined target is received. In detail, this disclosure uses the computer device 20 to receive the first connection location Y1 sent by the predetermined target 30.

In step S406, a first parking time is calculated according to the first connection location, the first positioning information, the closest parking area, and the high-precision map. In detail, this disclosure uses the computer device 20 to calculate the first parking time according to the first connection location, the first positioning information, the closest parking area, and the high-precision map. In this embodiment, the computer device 20 calculates a first time required for the autonomous driving vehicle 10 to drive from the predetermined location to the closest parking area according to the predetermined location and the closest parking area. The computer device 20 calculates a second time required for the autonomous driving vehicle 10 to drive from the closest parking area to the first connection location Y1 according to the closest parking area and the first connection location Y1. The computer device 20 calculates a third time required for the predetermined target 30 to move to the first connection location Y1 according to the first positioning information and the first connection location Y1. The first parking time is the third time minus the first time and the second time. It can be understood that when the autonomous driving vehicle 10 drives to the first connection location Y1 after parking in the closest parking area for the first parking time, the predetermined target 30 just arrives at the first connection location Y1, or the predetermined target 30 arrives at the first connection location Y1 before or after than the autonomous driving vehicle 10. In the current environment, the autonomous driving vehicle 10 is driving to the parking area A2 for parking, distance between the predetermined location and the parking area A2 is 0.5 km. According to the preset driving speed of 40 km/h, it can be calculated that the driving time of the autonomous driving vehicle 10 to drive from the predetermined location to the parking area A2 is 0.75 minutes. Distance between the first connection location Y1 and the parking area A2 is 1 km, and the driving time of the autonomous driving vehicle 10 to drive from the parking area A2 to the first connection location Y1 is 1.5 minutes. Distance between the passenger and the first connection location Y1 is 0.5 km, and walking speed of the passenger is about 1.5 m/s, so the time for the passenger to walk to the first connection location Y1 is 5.56 minutes. Therefore, it can be calculated that the first parking time is 3.31 minutes.

In step S408, it is determined that whether a parking time of the autonomous driving vehicle in the closest parking area is the same as the first parking time. In detail, this disclosure uses the computer device 20 to determine whether the parking time of the autonomous driving vehicle 10 in the closest parking area is the same as the first parking time. In this embodiment, when the autonomous driving vehicle 10 drives to the closest parking area, the timing starts to obtain the parking time.

In step S410, when the parking time of the autonomous driving vehicle in the closest parking area is the same as the first parking time, the autonomous driving vehicle is controlled to drive to the first connection location. In detail, when the parking time is the same as the first parking time, this disclosure uses the computer device 20 to control the autonomous driving vehicle 10 drive to the first connection location Y1.

In the above embodiment, after the autonomous driving vehicle is controlled to drive to the closest parking area and the first connection location is obtained, the parking time start to timing. The autonomous driving vehicle is controlled to parked in the closest parking area for a period of time and then drive to the first connection location to connect with the predetermined target. When the autonomous driving vehicle drives to the first connection location after parking in the closest parking area for the first parking time, the predetermined target just arrives at the first connection location, or the predetermined target arrives at the first connection location before or after than the autonomous driving vehicle. Then the predetermined target does not need to wait too long at the predetermined location.

Figure 6:
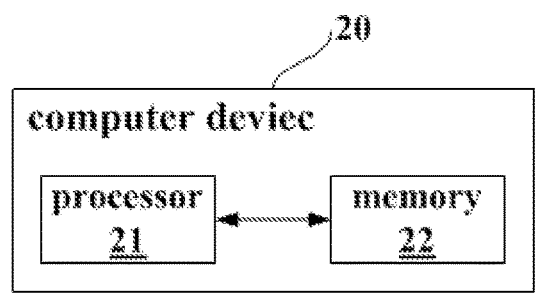
FIG. 6 illustrates a schematic diagram of a computer device in accordance with the embodiment.

Referring to FIG. 6, FIG. 6 illustrates a schematic diagram of a computer device in accordance with the embodiment. The computer device 20 includes a processor 21 and a memory 22. In this embodiment, the memory 22 configured to store program instructions. The processor 21 configured to execute the program instructions to enable the computer device 20 to perform control method for an autonomous driving vehicle.

The processor 21, in some embodiments, may be a Central Processing Unit (CPU), controller, microcontroller, microprocessor, or other data processing chip used to run the program instructions stored in the memory 22 that control the autonomous driving vehicle.

The memory 22 includes at least one type of readable storage medium, which includes flash memory, hard disk, multimedia card, card-type memory (for example, SD or DX memory, etc.), magnetic memory, disk, optical disc, etc. Memory 22 in some embodiments may be an internal storage unit of a computer device, such as a hard disk of a computer device. Memory 22, in other embodiments, can also be a storage device for external computer devices, such as a plug-in hard disk, a Smart Media Card (SMC), a Secure Digital (SD) Card, a Flash Card, etc. equipped on a computer device. Further, the memory 22 may include both the internal and external storage units of a computer device. The memory 22 can not only be used to store the application software and all kinds of data installed in the computer equipment, such as the code to realize the control method for autonomous driving vehicle, but also can be used to temporarily store the data that has been output or will be output.

In the above embodiments, it may be achieved in whole or in part by software, hardware, firmware, or any combination thereof. When implemented in software, it can be implemented in whole or in part as a computer program product.

The computer program product includes one or more computer instructions. When the computer program instructions are loaded and executer on a computer, a process or function according to the embodiment of the disclosure is generated in whole or in part. The computer device may be a general-purpose computer, a dedicated computer, a computer network, or other programmable device. The computer instruction can be stored in a computer readable storage medium, or transmitted from one computer readable storage medium to another computer readable storage medium. For example, the computer instruction can be transmitted from a web site, computer, server, or data center to another web site, computer, server, or data center through the cable (such as a coaxial cable, optical fiber, digital subscriber line) or wireless (such as infrared, radio, microwave, etc.). The computer readable storage medium can be any available medium that a computer can store or a data storage device such as a serve or data center that contains one or more available media integrated. The available media can be magnetic (e.g., floppy Disk, hard Disk, tape), optical (e.g., DVD), or semiconductor (e.g., Solid State Disk), etc.

The technicians in this field can clearly understand the specific working process of the system, device and unit described above, for convenience and simplicity of description, can refer to the corresponding process in the embodiment of the method described above, and will not be repeated here.

In the several embodiments provided in this disclosure, it should be understood that the systems, devices and methods disclosed may be implemented in other ways. For example, the device embodiments described above is only a schematic. For example, the division of the units, just as a logical functional division, the actual implementation can have other divisions, such as multiple units or components can be combined with or can be integrated into another system, or some characteristics can be ignored, or does not perform. Another point, the coupling or direct coupling or communication connection shown or discussed may be through the indirect coupling or communication connection of some interface, device or unit, which may be electrical, mechanical or otherwise.

The unit described as a detached part may or may not be physically detached, the parts shown as unit may or may not be physically unit, that is, it may be located in one place, or it may be distributed across multiple network units. Some or all of the units can be selected according to actual demand to achieve the purpose of this embodiment scheme.

In addition, the functional units in each embodiment of this disclosure may be integrated in a single processing unit, or may exist separately, or two or more units may be integrated in a single unit. The integrated units mentioned above can be realized in the form of hardware or software functional units.

The integrated units, if implemented as software functional units and sold or used as independent product, can be stored in a computer readable storage medium. Based on this understanding, the technical solution of this disclosure in nature or the part contribute to existing technology or all or part of it can be manifested in the form of software product. The computer software product stored on a storage medium, including several instructions to make a computer equipment (may be a personal computer, server, or network device, etc.) to perform all or part of steps of each example embodiments of this disclosure. The storage medium mentioned before includes U disk, floating hard disk, ROM (Read-Only Memory), RAM (Random Access Memory), floppy disk or optical disc and other medium that can store program codes.

It should be noted that the embodiments number of this disclosure above is for description only and do not represent the advantages or disadvantages of embodiments. And in this disclosure, the term "including", "include" or any other variants is intended to cover a non-exclusive contain. So that the process, the devices, the items, or the methods includes a series of elements not only include those elements, but also include other elements not clearly listed, or also include the inherent elements of this process, devices, items, or methods. In the absence of further limitations, the elements limited by the sentence "including a . . . " do not preclude the existence of other similar elements in the process, devices, items, or methods that include the elements.

The above are only the preferred embodiments of this disclosure and do not therefore limit the patent scope of this disclosure. And equivalent structure or equivalent process transformation made by the specification and the drawings of this disclosure, either directly or indirectly applied in other related technical fields, shall be similarly included in the patent protection scope of this disclosure.

The invention claimed is:

1. A control method for an autonomous driving vehicle, comprising:
   determining whether trigger information is received, the trigger information being indicated that a preset event occurs;
   when the trigger information is received and the autonomous driving vehicle has been located at a predetermined location at current moment, obtaining an arrival time required for a predetermined target to reach the predetermined location, the predetermined location is a preset connection location;
   determining whether the arrival time is greater than a preset value;
   when the arrival time is greater than the preset value, controlling the autonomous driving vehicle to drive to a parking area different from the preset connection location; and
   when the arrival time is not greater than the preset value, controlling the autonomous driving vehicle to drive away from the predetermined location to the predetermined location again or a re-planning connection location according to preset rules;
   wherein obtaining an arrival time required for a predetermined target to reach the predetermined location comprises: obtaining a first positioning information of the predetermined target at the current moment; obtaining a second positioning information of the autonomous driving vehicle at the current moment; and calculating the arrival time according to a high-precision map, the first positioning information, and the second positioning information;
   wherein controlling the autonomous driving vehicle to drive to a parking area different from the preset connection location comprises: obtaining several parking areas according to the high-precision map; selecting a parking area closest to the predetermined location from several parking areas as a closest parking area; and controlling the autonomous driving vehicle to drive to the closest parking area;
   wherein the control method further comprise sending an intent instruction to the predetermined target, the intent instruction is used for the predetermined target to select a first connection location, the first connection location is the predetermined location or the re-planning connection location which includes the closest parking area and a new designated location; receiving the first connection location sent by the predetermined target; calculating a first parking time according to the first connection location, the first positioning information, the closest parking area, and the high-precision map; determining whether a parking time of the autonomous driving vehicle in the closest parking area is the same as the first parking time; and when the parking time of the autonomous driving vehicle in the closest parking area is the same as the first parking time, controlling the autonomous driving vehicle to drive to the first connection location.

2. The control method as claimed in claim 1, further comprising:
   sending notification instruction to the predetermined target, the notification instruction being used to notify the predetermined target that the autonomous driving vehicle has left the predetermined location;
   determining whether an arrival instruction sent by the predetermined target is received; and
   when the arrival instruction sent by the predetermined target is received, controlling the autonomous driving vehicle to drive to the predetermined location.

3. The control method as claimed in claim 1, further comprising:
   calculating a second parking time according to the arrival time and a driving time, the driving time is the time for the autonomous driving vehicle to drive from the predetermined location to the closest parking area;

determining whether the parking time of the autonomous driving vehicle in the closest parking area is the same as the second parking time; and when the parking time of the autonomous driving vehicle in the closest parking area is the same as the second parking time, controlling the autonomous driving vehicle to drive to the predetermined location.

4. The control method as claimed in claim 1, wherein controlling the autonomous driving vehicle to drive away from the predetermined location to the predetermined location or a re-planning connection location according to preset rules comprises:

generating a first driving trajectory according to the high-precision map, the arrival time, and a preset driving speed, where a destination of the first driving trajectory is the predetermined location; and controlling the autonomous driving vehicle to drive away from the predetermined location to the predetermined location again according to the first driving trajectory at the preset driving speed.

5. The control method as claimed in claim 1, wherein controlling the autonomous driving vehicle to drive away from the predetermined location to the predetermined location again or a re-planning connection location according to preset rules comprises:

generating a second driving trajectory according to the high-precision map, the first positioning information, and the second positioning information, a starting point of the second driving trajectory is the predetermined location, where a destination of the second driving trajectory is a location of the predetermined target at the current moment;

generating a second connection location according to the second driving trajectory, the arrival time, and the preset driving speed, where the second connection location is the re-planning connection location that at the second driving trajectory; and controlling the autonomous driving vehicle to drive away from the predetermined location to the second connection location according to the second driving trajectory at the preset driving speed.

6. The control method as claimed in claim 1, wherein obtaining an arrival time required for a predetermined target to reach the predetermined location comprises:

sending confirmation instruction to the predetermined target, the confirmation instruction includes several time options; and receiving one of the several time options sent by the predetermined target as the arrival time.

7. A computer device, comprising:
a memory configured to store program instructions; and
a processor configured to execute the program instructions to enable the computer device to perform a control method for an autonomous driving vehicle, wherein the control method comprises:

determining whether trigger information is received, the trigger information being indicated that a preset event occurs;

when the trigger information is received and the autonomous driving vehicle has been located at a predetermined location at current moment, obtaining an arrival time required for a predetermined target to reach the predetermined location, the predetermined location is a preset connection location;

determining whether the arrival time is greater than a preset value;

when the arrival time is greater than the preset value, controlling the autonomous driving vehicle to drive to a parking area different from the preset connection location; and when the arrival time is not greater than the preset value, controlling the autonomous driving vehicle to drive away from the predetermined location to the predetermined location again or a re-planning connection location according to preset rules;

wherein obtaining an arrival time required for a predetermined target to reach the predetermined location comprises: obtaining a first positioning information of the predetermined target at the current moment; obtaining a second positioning information of the autonomous driving vehicle at the current moment; and calculating the arrival time according to a high-precision map, the first positioning information, and the second positioning information;

wherein controlling the autonomous driving vehicle to drive to a parking area different from the preset connection location comprises: obtaining several parking areas according to the high-precision map; selecting a parking area closest to the predetermined location from several parking areas as a closest parking area; and controlling the autonomous driving vehicle to drive to the closest parking area;

wherein the control method further comprises: sending an intent instruction to the predetermined target, the intent instruction is used for the predetermined target to select a first connection location, the first connection location is the predetermined location or the re-planning connection location which includes the closest parking area and a new designated location; receiving the first connection location sent by the predetermined target; calculating a first parking time according to the first connection location, the first positioning information, the closest parking area, and the high-precision map; determining whether a parking time of the autonomous driving vehicle in the closest parking area is the same as the first parking time; and when the parking time of the autonomous driving vehicle in the closest parking area is the same as the first parking time, controlling the autonomous driving vehicle to drive to the first connection location.

8. The computer device as claimed in claim 7, further comprising:

sending notification instruction to the predetermined target, the notification instruction being used to notify the predetermined target that the autonomous driving vehicle has left the predetermined location;

determining whether an arrival instruction sent by the predetermined target is received; and when the arrival instruction sent by the predetermined target is received, controlling the autonomous driving vehicle to drive to the predetermined location.

9. The computer device as claimed in claim 7, further comprising:

calculating a second parking time according to the arrival time and a driving time, the driving time is the time for the autonomous driving vehicle to drive from the predetermined location to the closest parking area;

determining whether the parking time of the autonomous driving vehicle in the closest parking area is the same as the second parking time; and when the parking time of the autonomous driving vehicle in the closest parking area is the same as the second parking time, controlling the autonomous driving vehicle to drive to the predetermined location.

10. The computer device as claimed in claim 7, wherein controlling the autonomous driving vehicle to drive away from the predetermined location to the predetermined location or a re-planning connection location according to preset rules comprises:
   generating a first driving trajectory according to the high-precision map, the arrival time, and a preset driving speed, where a destination of the first driving trajectory is the predetermined location; and
   controlling the autonomous driving vehicle to drive away from the predetermined location to the predetermined location again according to the first driving trajectory at the preset driving speed.

11. The computer device as claimed in claim 7, wherein controlling the autonomous driving vehicle to drive away from the predetermined location to the predetermined location or a re-planning connection location according to preset rules comprises:
   generating a second driving trajectory according to the high-precision map, the first positioning information, and the second positioning information, a starting point of the second driving trajectory is the predetermined location, where a destination of the second driving trajectory is a location of the predetermined target at the current moment;
   generating a second connection location according to the second driving trajectory, the arrival time, and the preset driving speed, where the second connection location is the re-planning connection location that at the second driving trajectory; and
   controlling the autonomous driving vehicle to drive away from the predetermined location to the second connection location according to the second driving trajectory at the preset driving speed.

12. The computer device as claimed in 7, wherein obtaining an arrival time required for a predetermined target to reach the predetermined location comprises:
   sending confirmation instruction to the predetermined target, the confirmation instruction includes several time options; and
   receiving one of the several time options sent by the predetermined target as the arrival time.

* * * * *